(12) United States Patent
He

(10) Patent No.: US 10,386,622 B2
(45) Date of Patent: Aug. 20, 2019

(54) POLARIZING DEVICE FOR POLARIZING MICROSCOPES AND METHOD FOR USING THE POLARIZING DEVICE

(71) Applicant: CHENGDU WESTIMAGE TECHNOLOGY CO., LTD, Chengdu (CN)

(72) Inventor: Haibo He, Chengdu (CN)

(73) Assignee: CHENGDU WESTIMAGE TECHNOLOGY CO., LTD, Chengdu (CN)

( * ) Notice: Subject to any disclaimer, the term of this patent is extended or adjusted under 35 U.S.C. 154(b) by 187 days.

(21) Appl. No.: 15/630,922

(22) Filed: Jun. 22, 2017

(65) Prior Publication Data

US 2017/0285316 A1    Oct. 5, 2017

Related U.S. Application Data

(63) Continuation-in-part of application No. PCT/CN2015/099799, filed on Dec. 30, 2015.

(30) Foreign Application Priority Data

Dec. 23, 2014 (CN) .......................... 2014 1 0808680

(51) Int. Cl.
  *G02B 21/10* (2006.01)
  *G02B 27/28* (2006.01)
  (Continued)

(52) U.S. Cl.
  CPC ......... *G02B 21/0092* (2013.01); *G02B 21/24* (2013.01); *G02B 27/28* (2013.01); *G02B 27/281* (2013.01)

(58) Field of Classification Search
  CPC .......... G01N 21/6458; G01N 15/1475; G01N 21/21; G01N 21/255; G01N 21/41; G01N 21/4795; G01N 21/553; G01N 21/6428; G01N 21/77; G01N 15/10; G01N 15/1404; G01N 15/1459; G01N 2015/1006; G01N 2015/105; G01N 2015/1409; G01N 2015/1411; G01N 2015/149; G01N 2021/0307; G01N 2021/0325; G01N 2021/058; G01N 2021/335; G01N 2021/6417; G01N 2021/6441; G01N 2021/6471; G01N 2021/6478;

(Continued)

(56) References Cited

U.S. PATENT DOCUMENTS

| 6,167,173 A * | 12/2000 | Schoeppe ............ G02B 21/002 250/234 |
| 2009/0257107 A1* | 10/2009 | Wolleschensky ..... G01J 3/1256 359/285 |

(Continued)

*Primary Examiner* — Collin X Beatty
*Assistant Examiner* — Grant A Gagnon
(74) *Attorney, Agent, or Firm* — Matthias Scholl P.C.; Matthias Scholl

(57) ABSTRACT

A polarizing device for a polarizing microscope, including: a base plate on which the polarizing microscope is fixed, a base support, a lower polarizing assembly, and an upper polarizing assembly. The base support is vertically disposed at one side of the base plate. The lower polarizing assembly is disposed at the lower-middle part of the base support, and the upper polarizing assembly is disposed at the upper part of the base support.

7 Claims, 7 Drawing Sheets

(51) Int. Cl.
G02B 21/00 (2006.01)
G02B 21/24 (2006.01)

(58) Field of Classification Search
CPC ..... G01N 2021/6482; G01N 2021/653; G01N 2021/7776; G01N 2021/7786; G01N 21/17; G01N 21/19; G01N 21/23; G01N 21/33; G01N 21/45; G01N 21/453; G01N 21/6408; G01N 21/6445; G01N 21/645; G01N 21/6452; G01N 21/6486; G01N 21/65; G01N 21/9501; G01N 2201/0221; G01N 2201/061; G01N 2201/06113; G01N 2201/0675; G01N 2201/0683; G01N 2201/0697; G01N 2203/0062; G01N 2203/0098; G01N 2203/0276; G01N 2203/0647; G01N 25/00; G01N 27/002; G01N 33/4833; G01N 3/04; G01N 3/08; G01N 3/48; A61B 18/203; A61B 2017/00154; A61B 2017/00769; A61B 2018/00458; A61B 2018/0047; A61B 2018/00476; A61B 2018/00732; A61B 2018/2035; A61B 2090/049; A61B 2090/061; A61B 2090/065; A61B 2018/20351; A61B 5/0066; A61B 18/24; A61B 1/00181; A61B 1/00183; A61B 1/05; A61B 2018/00577; A61B 2018/00601; A61B 2018/00648; A61B 2018/00666; A61B 2018/00791; A61B 2018/00982; A61B 2018/2085; A61B 2018/2205; A61B 2018/2266; A61B 2018/2277; A61B 2018/2283; A61B 2018/2294; A61B 2090/304; A61B 2090/502; A61B 3/102; A61B 5/0059; A61B 90/30; A61B 90/50
USPC .......................................................... 359/371
See application file for complete search history.

(56) References Cited

U.S. PATENT DOCUMENTS

| | | | | |
|---|---|---|---|---|
| 2010/0269572 | A1* | 10/2010 | Jiang ................. | G01N 21/0303 73/61.41 |
| 2010/0277794 | A1* | 11/2010 | Utsugi ............... | G02B 21/0032 359/386 |
| 2011/0194101 | A1* | 8/2011 | Tachizaki ........... | G01N 21/9501 356/72 |

* cited by examiner

POLARIZING DEVICE FOR POLARIZING MICROSCOPES AND METHOD FOR USING THE POLARIZING DEVICE

CROSS-REFERENCE TO RELATED APPLICATIONS

This application is a continuation-in-part of International Patent Application No. PCT/CN2015/099799 with an international filing date of Dec. 30, 2015, designating the United States, now pending, and further claims foreign priority benefits to Chinese Patent Application No. 201410808680.X filed Dec. 23, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to an auxiliary device for a polarizing microscope, and more particularly, to an automatic polarizing device for polarizing microscopes and a method for using the automatic polarizing device.

Description of the Related Art

The polarizing microscope is an apparatus that can be used for identifying and studying birefringent materials based on the polarization of light. Conventionally, the positions and angles of the polarizer and the analyzer are fixed. In use, the angle of the polarized light incident on the material is changed by rotating the glass slide. This results in a lower recognition and the difficulty of renewed observation after the glass slide is rotated.

SUMMARY OF THE INVENTION

In view of the above-described problems, it is one objective of the invention to provide an automatic polarizing device for polarizing microscopes and a method for using the automatic polarizing device.

To achieve the above objective, in accordance with one embodiment of the invention, there is provided an automatic polarizing device for polarizing microscopes, comprising a base plate, a base support, a lower polarizing assembly, and an upper polarizing assembly. The base support is vertically disposed at one side of the base plate. A polarizing microscope is mounted on the base plate via a fixing device. The lower polarizing assembly is disposed at a lower-middle part of the base support. The upper polarizing assembly is disposed at an upper part of the base support.

In a class of this embodiment, the upper polarizing assembly comprises an upper shell, an upper polarizer, and an upper drive system. A first end of the upper shell is disposed in the base support, and a second end of the upper shell is provided with a first light hole. The upper polarizer is disposed in the first light hole via a first wheel of upper polarizer. The upper drive system is disposed in the first end of the upper shell, and is connected to the first wheel. The upper shell is provided with an upper cover board.

In a class of this embodiment, the second end of the upper shell is inserted to an analyzer socket of the polarizing microscope. The upper drive system comprises a first stepping motor, an upper controller, an upper transmission wheel, a first synchronous belt, and a second synchronous belt. The upper controller is fixed at an upper side surface of the upper shell via a controller support, and the first stepping motor is fixed at the upper side surface of the upper shell via a motor support. A rotary shaft of the upper transmission wheel is connected to the upper controller. A wheel body of the upper transmission wheel is connected to a torque output shaft of the first stepping motor via the first synchronous belt. The wheel body of the upper transmission wheel is connected to the first wheel via the second synchronous belt. An output end of control signals of the upper controller is connected to the first stepping motor.

In a class of this embodiment, a second light hole is disposed on the second end of the upper shell at an outer end of the first light hole. A dimmer is disposed in the second light hole.

In a class of this embodiment, the upper drive system further comprises a second stepping motor, a photoelectric switch, a motor connecting plate, and a linear slide rail. The linear slide rail is disposed on an upper surface of the motor connecting plate. A lower surface of the upper shell is provided with a guide rail slider. The guide rail slider is disposed in the linear slide rail. The second stepping motor is fixedly connected to a lower surface of the motor connecting plate. A gear rack is disposed at one side of a bottom surface of the upper shell. A torque output shaft of the second stepping motor is provided with a gear. The gear is meshed with the gear rack. The photoelectric switch is disposed at an outer end of the linear slide rail. A signal output end of the photoelectric switch is connected to a signal input end of the upper controller. An input end of control signals of the second stepping motor is connected to the output end of control signals of the upper controller.

In a class of this embodiment, the lower polarizing assembly comprises a lower shell, a lower polarizer, and a lower drive system. A first end of the lower shell is disposed in the base support, and a second end of the lower shell is provided with a third light hole. The lower polarizer is mounted in the third light hole via a second wheel of lower polarizer. The lower drive system is disposed in the first end of the lower shell, and is connected to the second wheel. The lower shell is provided with a lower cover board.

In a class of this embodiment, the lower drive system comprises a third stepping motor, a lower controller, and a lower transmission wheel. The lower controller is mounted on an upper surface of the lower shell via a fixing sleeve. The third stepping motor is mounted on a lower surface of the lower shell. A rotary shaft of the lower transmission wheel is connected to a torque output shaft of the third stepping motor and the lower controller. A rotary wheel of the lower transmission wheel is connected to the second wheel via a third synchronous belt. An output end of control signals of the lower controller is connected to an input end of control signals of the third stepping motor.

A method for using the automatic polarizing device, comprising:

1) mounting and fixing a polarizing microscope on a base plate via a fixing screw; placing a second end of a lower polarizing assembly at a polarization starter of the polarizing microscope; inserting a second end of an upper polarizing assembly to an analyzer socket of the polarizing microscope;
2) controlling rotations of a first stepping motor and a third stepping motor using an upper controller and a lower controller; adjusting angles between an upper polarizer and a lower polarizer, and polarizing directions of the upper polarizer and the lower polarizer being mutually perpendicular;

3) when conducing a microscopic examination of orthogonal polarized lights, controlling the upper polarizer and the lower polarizer to rotate towards same direction and at same angular velocity using the upper controller and the lower controller; and 4) when conducting a microscopic examination of single polarized light, controlling the upper polarizer to rotate using the upper controller to allow polarizing directions of the upper polarizer and the lower polarizer to be parallel, or controlling a second stepping motor using the upper controller and moving the upper polarizer out of a light path of the polarizing microscope, and placing a dimmer in the light path of the polarizing microscope.

In a class of this embodiment, the upper controller and the lower controller are encoders LI38T08.

Advantages of the automatic polarizing device and the method according to embodiments of the invention are summarized as follows:

By coordinating the upper polarizer with the lower polarizer, automatic microscopic examination of orthogonal polarized lights or single polarized light is realized, and the examination is accurate.

BRIEF DESCRIPTION OF THE DRAWINGS

The invention is described hereinbelow with reference to the accompanying drawings, in which.

Figure 1:
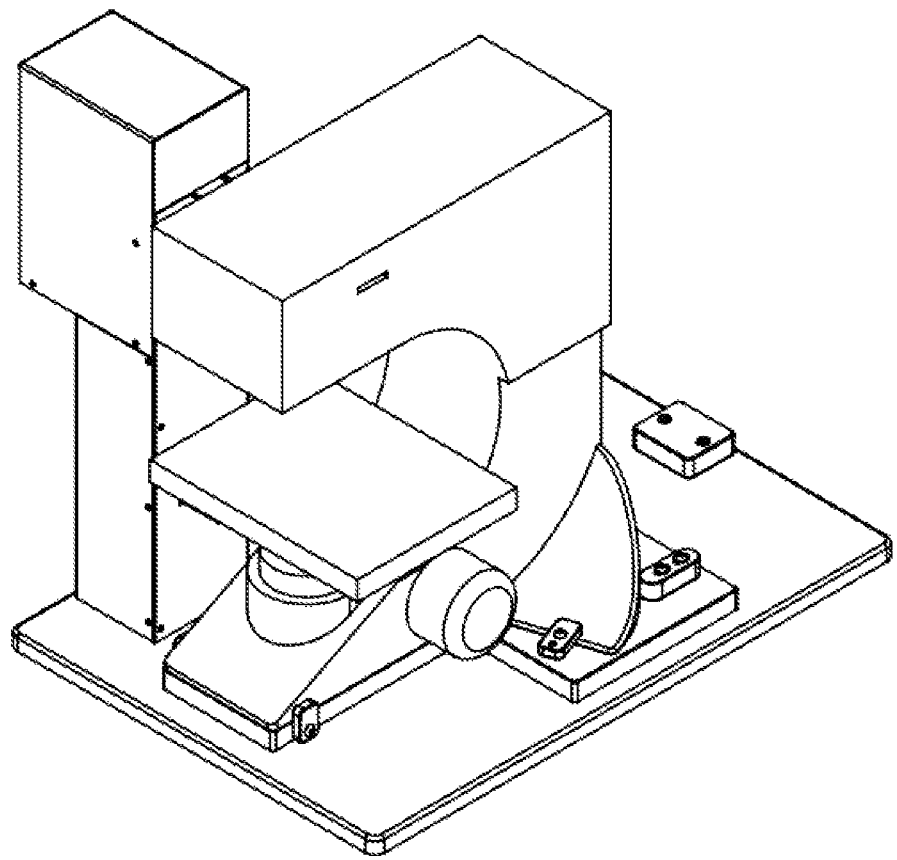
FIG. 1 is a schematic diagram of an automatic polarizing device of a polarizing microscope in accordance with one embodiment of the invention.

In the drawings, the following reference numbers are used: 100. Polarizing microscope; 200. Base plate; 300. Base support; 400. Lower polarizing assembly; 500. Upper polarizing assembly; 401. Lower shell; 402. Third stepping motor; 403. Lower controller; 404. Lower polarizer; 405. Lower transmission wheel; 406. Second wheel; 407. Lower fixing sleeve; 408. Lower cover board; 501. Upper shell; 502. Upper cover board; 503. Upper transmission wheel; 504. First wheel; 505. Upper controller; 506. First stepping motor; 507. Controller support; 508. Upper polarizer; 509. Second stepping motor; 510. Linear slide rail; 511. Gear; 512. Motor connecting board; 513. First synchronous belt; 514. Second synchronous belt; 515. Photoelectric switch; 516. Dimmer; and 517. Motor support.

DETAILED DESCRIPTION OF THE EMBODIMENTS

For further illustrating the invention, experiments detailing a polarizing device for polarizing microscopes and a method for using the polarizing device are described below. It should be noted that the following examples are intended to describe and not to limit the invention.

Figure 2:
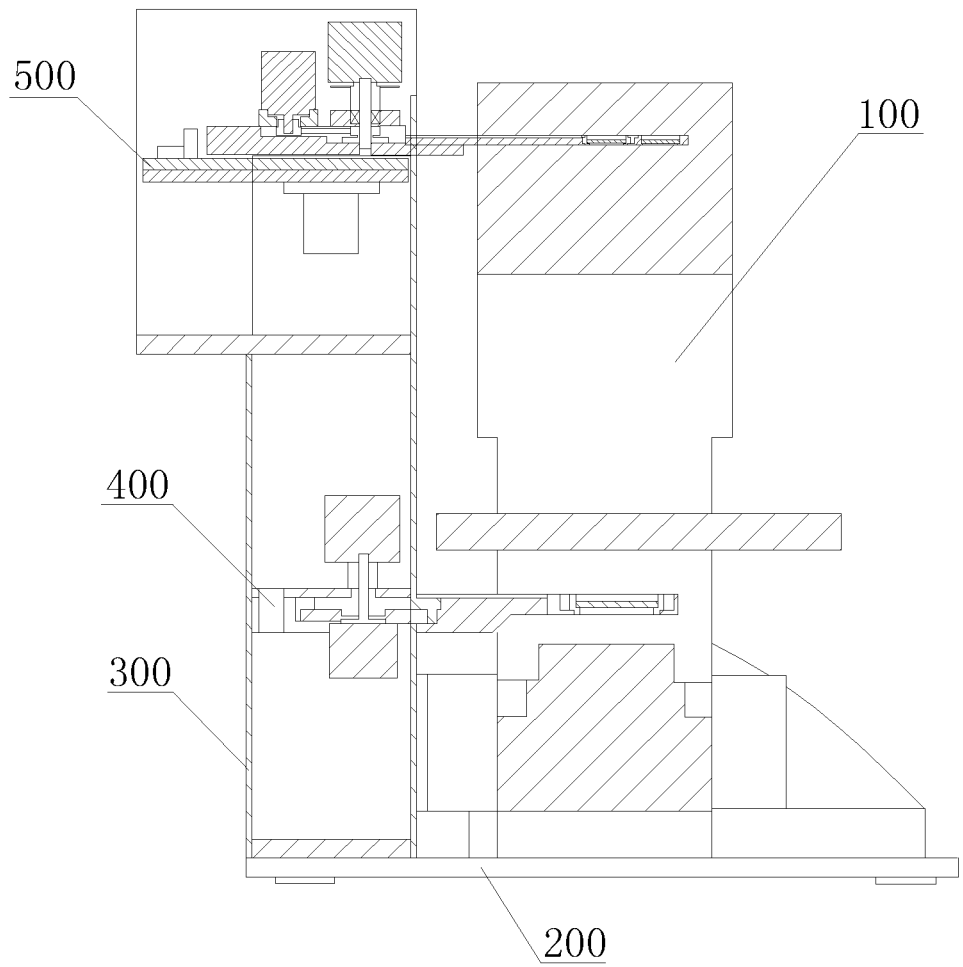
FIG. 2 is a cross-sectional view of an automatic polarizing device of a polarizing microscope in accordance with one embodiment of the invention.
Figure 3:
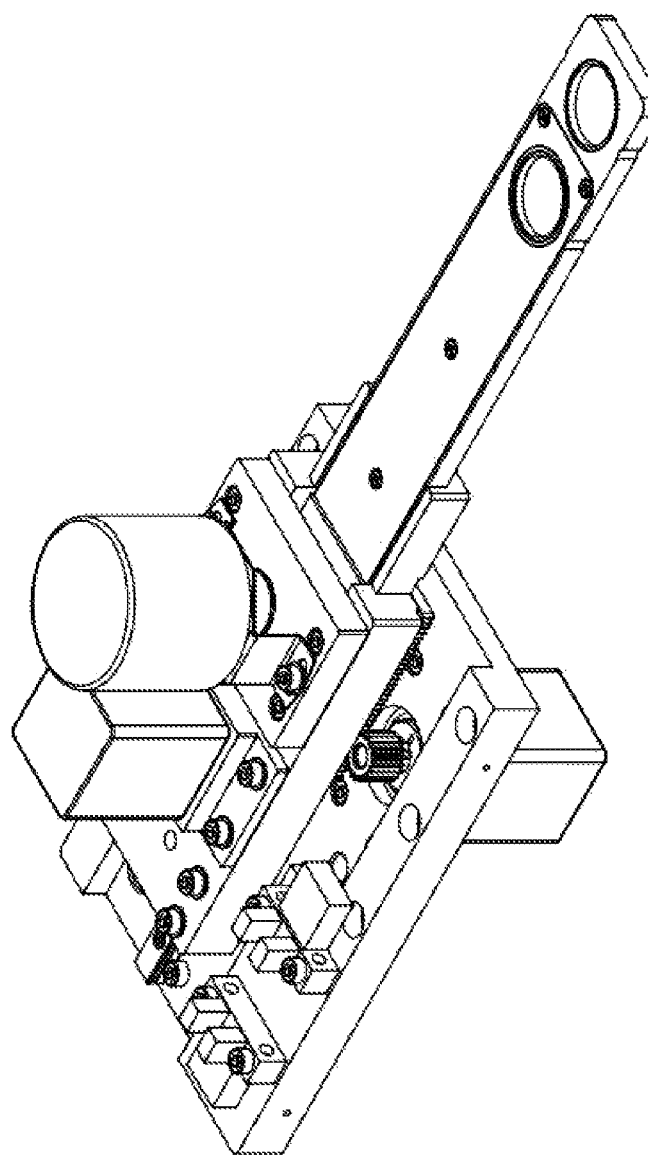
FIG. 3 is a stereogram of an upper polarizing assembly of an automatic polarizing device in accordance with one embodiment of the invention.
Figure 4:
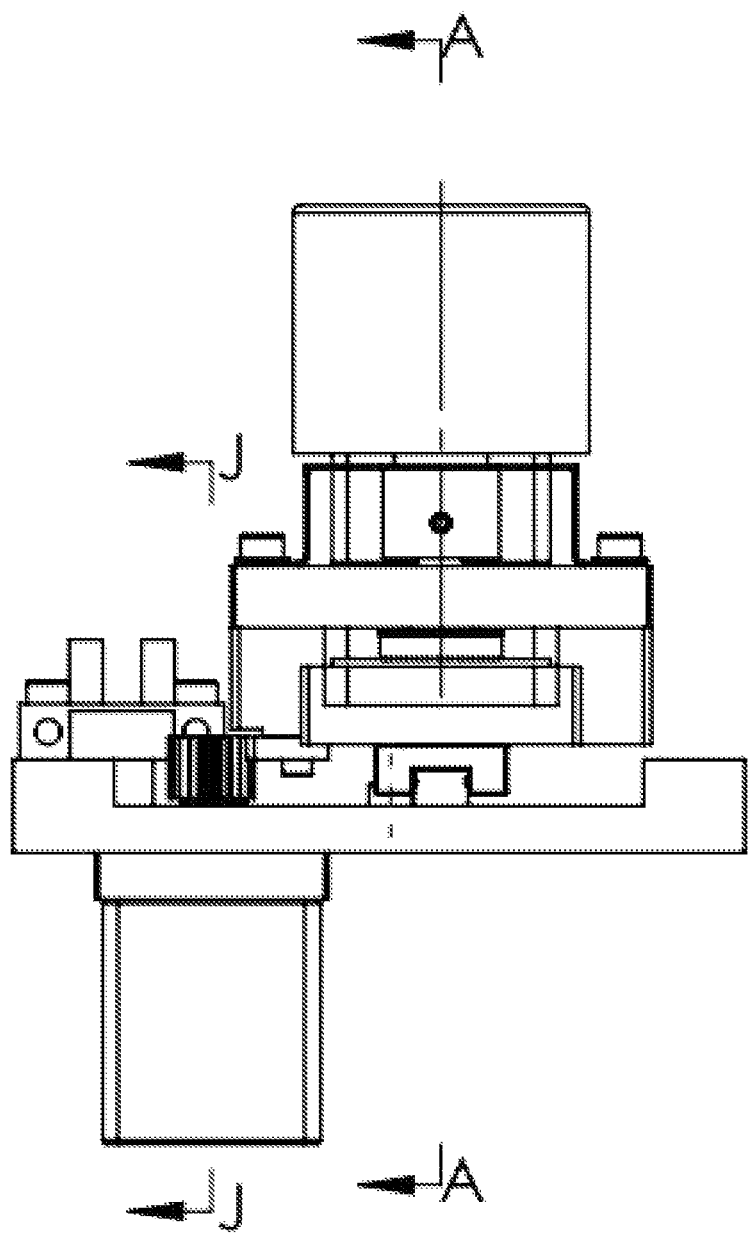
FIG. 4 is a side view of an upper polarizing assembly of an automatic polarizing device in accordance with one embodiment of the invention.
Figure 5:
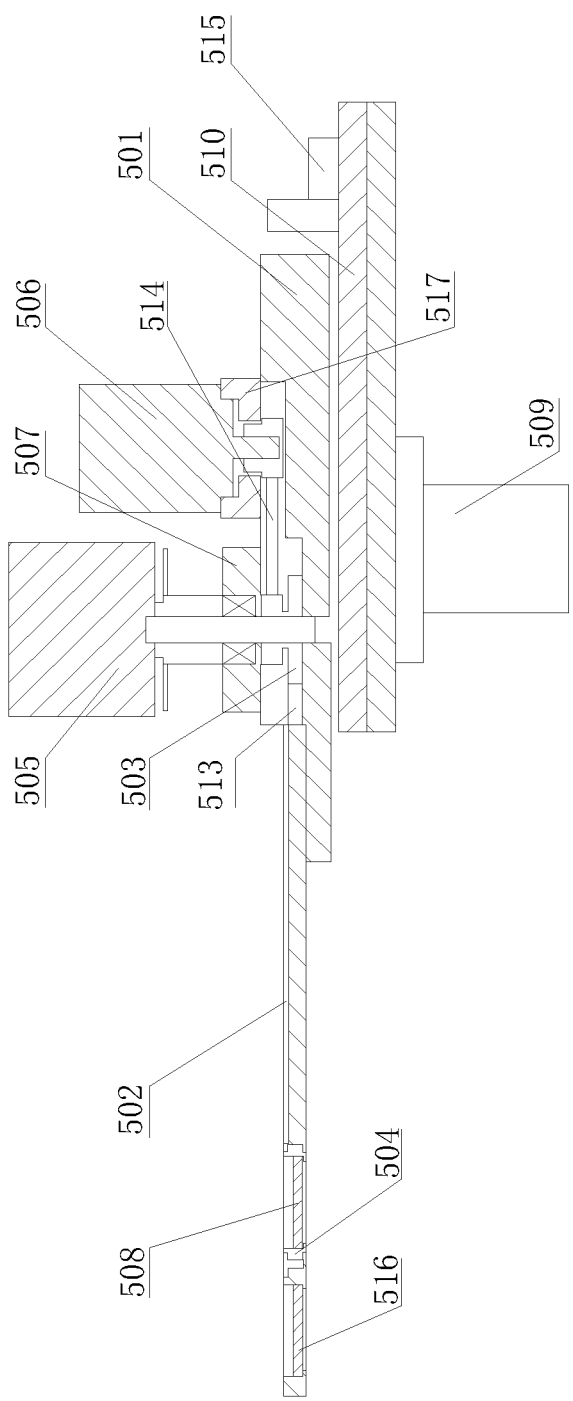
FIG. 5 is a cross-sectional view taken from line A-A in FIG. 4.
Figure 6:
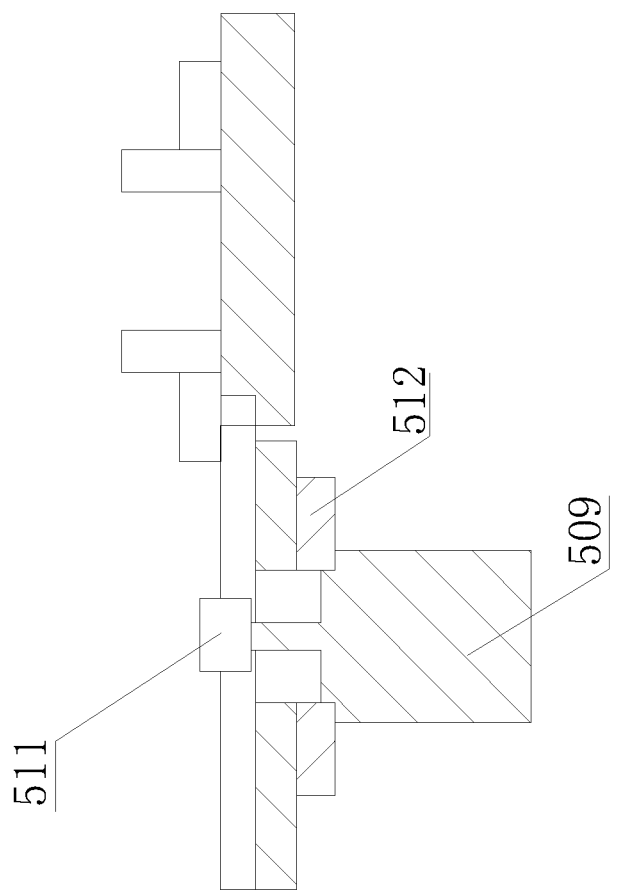
FIG. 6 is a cross-sectional view taken from line J-J in FIG. 4.

As shown in FIGS. 1-2, an automatic polarizing device for polarizing microscopes comprises a base plate 200, a base support 300, a lower polarizing assembly 400, and an upper polarizing assembly 500. The base support 300 is vertically disposed at one side of the base plate 200. A polarizing microscope 100 is mounted on the base plate 200 via a fixing device. The lower polarizing assembly 400 is disposed at a lower-middle part of the base support 300. The upper polarizing assembly 500 is disposed at an upper part of the base support 300.

As shown in FIGS. 3-6, the upper polarizing assembly 500 comprises an upper shell 501, an upper polarizer 508, and an upper drive system. A first end of the upper shell 501 is disposed in the base support 300, and a second end of the upper shell 501 is provided with a first light hole. The upper polarizer 508 is disposed in the first light hole via a first wheel 504 of upper polarizer. The upper drive system is disposed in the first end of the upper shell 501, and is connected to the first wheel 504. The upper shell 501 is provided with an upper cover board 502. The second end of the upper shell 501 is inserted to an analyzer socket of the polarizing microscope 100. The upper drive system comprises a first stepping motor 506, an upper controller 505, an upper transmission wheel 503, a first synchronous belt 513, a second synchronous belt 514, a second stepping motor 509, a photoelectric switch 515, a motor connecting plate 512, and a linear slide rail. The upper controller 505 is fixed at an upper side surface of the upper shell 501 via a controller support 507, and the first stepping motor 506 is fixed at the upper side surface of the upper shell via a motor support 517. A rotary shaft of the upper transmission wheel 503 is connected to the upper controller 505. A wheel body of the upper transmission wheel 503 is connected to a torque output shaft of the first stepping motor 506 via the first synchronous belt 513. The wheel body of the upper transmission wheel 503 is connected to the first wheel 504 via the second synchronous belt 514. An output end of control signals of the upper controller 505 is connected to the first stepping motor 506. A second light hole is disposed on the second end of the upper shell 501 at an outer end of the first light hole. A dimmer 516 is disposed in the second light hole. The linear slide rail is disposed on an upper surface of the motor connecting plate 512. A lower surface of the upper shell 501 is provided with a guide rail slider. The guide rail slider is disposed in the linear slide rail. The second stepping motor 509 is fixedly connected to a lower surface of the motor connecting plate 512. A gear rack is disposed at one side of a bottom surface of the upper shell 501. A torque output shaft of the second stepping motor 509 is provided a gear 511. The gear 511 is meshed with the gear rack. The photoelectric switch 515 is disposed at an outer end of the linear slide rail. A signal output end of the photoelectric switch 515 is connected to a signal input end of the upper controller 505. An input end of control signals of the second stepping motor 509 is connected to the output end of control signals of the upper controller 505.

Figure 7:
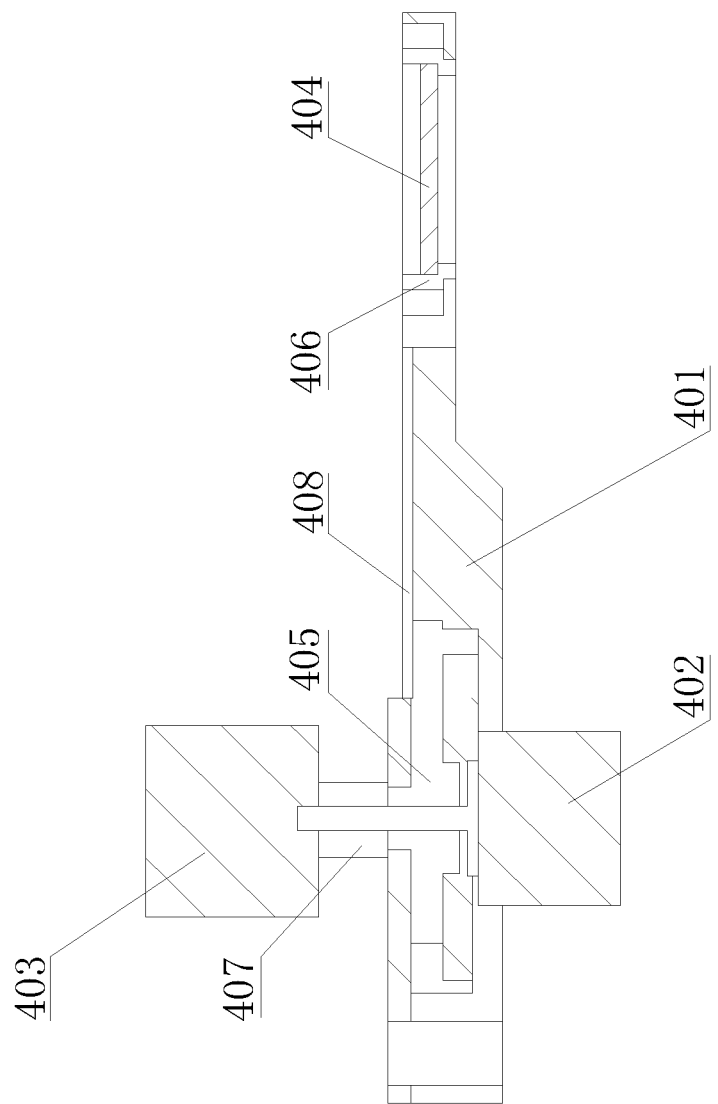
FIG. 7 is a cross-sectional view of a lower polarizing assembly of an automatic polarizing device in accordance with one embodiment of the invention.

As shown in FIG. 7, the lower polarizing assembly 400 comprises a lower shell 401, a lower polarizer 404, and a lower drive system. A first end of the lower shell 401 is disposed in the base support 300, and a second end of the lower shell 401 is provided with a third light hole. The lower polarizer 404 is mounted in the third light hole via a second wheel 406 of lower polarizer. The lower drive system is disposed in the first end of the lower shell 501, and is connected to the second wheel 406. The lower shell 401 is provided with a lower cover board 408. The lower drive system comprises a third stepping motor 402, a lower controller 403, and a lower transmission wheel 405. The lower controller 403 is mounted on an upper surface of the lower shell 401 via a fixing sleeve. The third stepping motor 402 is disposed on a lower surface of the lower shell. A rotary shaft of the lower transmission wheel 405 is connected to a torque output shaft of the third stepping motor 402 and the lower controller 403. A rotary wheel of the lower transmission wheel 405 is connected to the second wheel 406 via a third synchronous belt. An output end of control signals of the lower controller 403 is connected to an input end of control signals of the third stepping motor 402.

The upper controller 505 and the lower controller 403 are encoders LI38T08.

A method for using the automatic polarizing device for a polarizing microscope, comprises A1: mounting and fixing a polarizing microscope 100 on the base plate 200 via a fixing screw, and placing a second end of a lower polarizing assembly 400 at a polarization starter of the polarizing microscope 100; inserting a second end of an upper polarizing assembly 500 to an analyzer socket of the polarizing microscope 100;

A2: controlling rotations of a first stepping motor 506 and a third stepping motor 402 using an upper controller 505 and a lower controller 403; adjusting angles between an upper polarizer 508 and a lower polarizer 404, and polarizing directions of the upper polarizer and the lower polarizer being mutually perpendicular;

A3: executing B1 to conduct a microscopic examination of orthogonal polarized lights, or executing B2 or B3 to conduct a microscopic examination of single polarized light;

B1: controlling the upper polarizer 508 and the lower polarizer 404 to rotate towards same direction and at same angular velocity using the upper controller 505 and the lower controller 403 to perform the microscopic examination of orthogonal polarized lights;

B2: controlling the upper polarizer 508 to rotate using the upper controller 505, and polarizing directions of the upper polarizer 508 and the lower polarizer 404 being parallel to perform the microscopic examination of single polarized light;

B3: controlling a second stepping motor 509 using the upper controller 505 and moving the upper polarizer 508 out of a light path of the polarizing microscope 100; and placing the dimmer 516 in the light path of the polarizing microscope 100 to perform the microscopic examination of single polarized light.

The working principles of the polarizing device for polarizing microscopes and the method for using the polarizing device are as follows:

The polarizing microscope 100 is mounted and fixed on the base plate 200 via a fixing screw. The second end of the lower polarizing assembly 400 is placed at the polarization starter of the polarizing microscope 100. The second end of the upper polarizing assembly 500 is inserted to the analyzer socket of the polarizing microscope 100. Rotations of the first stepping motor 506 and the third stepping motor 402 are controlled using the upper controller 505 and the lower controller 403. The first stepping motor 506 drives the upper transmission wheel 503 to rotate via the first synchronous belt 513. Meanwhile, the upper transmission wheel 503 drives the first wheel 504 to rotate via the second synchronous belt 514 so as to adjust the angle of the upper polarizer 508. The rotary shaft of the upper transmission wheel 503 is connected to the angle sensor in the upper controller 505, thus the upper controller 505 controls the angle of the upper polarizer 508. Similarly, the lower controller 403 and the third stepping motor 402 control the angle of the lower polarizer 404.

The upper polarizer 508 and the lower polarizer 404 is controlled to rotate towards same direction and at same angular velocity using the upper controller 505 and the lower controller 403 to perform microscopic examination of orthogonal polarized lights, thus the examination of polarized light at various angles is realized without rotating the glass slide.

To perform the microscopic examination of single polarized light, the upper polarizer 508 is controlled by the upper controller 505 to rotate, and polarizing directions of the upper polarizer 508 and the lower polarizer 404 are parallel; or, to perform the microscopic examination of single polarized light, the second stepping motor 509 is controlled by the upper controller 505 so as to move the upper polarizer 508 out of a light path of the polarizing microscope 100, and the dimmer 516 is placed in the light path of the polarizing microscope 100. The dimmer 516 reduces the intensity of light into the eyepiece of the polarizing microscope 100 and avoids sudden intensification of light.

The light source of the polarizing microscope 100 is a controlled independent source. An input end of control signals of the light source is connected to the upper controller 505, thus during the microscopic examination, the brightness of the light source is automatically reduced, avoiding sudden intensification of light.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A polarizing device for a polarizing microscope, the device comprising:
 a base plate on which the polarizing microscope is fixed;
 a base support;
 a lower polarizing assembly; and
 an upper polarizing assembly;
 wherein:
 the base support is vertically disposed at one side of the base plate;
 the lower polarizing assembly is disposed at a lower-middle part of the base support;
 the upper polarizing assembly is disposed at an upper part of the base support; and
 the upper polarizing assembly comprises an upper shell, an upper polarizer, and an upper drive system; a first end of the upper shell is disposed in the base support, and a second end of the upper shell is provided with a first light hole; the upper polarizer is disposed in the first light hole via a first wheel of the upper polarizer; the upper drive system is disposed in the first end of the upper shell, and is connected to the first wheel; and the upper shell is provided with an upper cover board.

2. The polarizing device of claim 1, wherein the second end of the upper shell is inserted to an analyzer socket of the polarizing microscope; the upper drive system comprises a first stepping motor, an upper controller, an upper transmission wheel, a first synchronous belt, and a second synchronous belt; the upper controller is fixed at an upper side surface of the upper shell via a controller support, and the first stepping motor is fixed at the upper side surface of the upper shell via a motor support; a rotary shaft of the upper transmission wheel is connected to the upper controller; a wheel body of the upper transmission wheel is connected to a torque output shaft of the first stepping motor via the first synchronous belt; the wheel body of the upper transmission wheel is connected to the first wheel via the second synchronous belt; and an output end of control signals of the upper controller is connected to the first stepping motor.

3. The polarizing device of claim 1, wherein a second light hole is disposed on the second end of the upper shell at an outer end of the first light hole; and a dimmer is disposed in the second light hole.

4. The polarizing device of claim 2, wherein the upper drive system further comprises a second stepping motor, a photoelectric switch, a motor connecting plate, and a linear slide rail; the linear slide rail is disposed on an upper surface of the motor connecting plate; a lower surface of the upper shell is provided with a guide rail slider; the guide rail slider is disposed in the linear slide rail; the second stepping motor is fixedly connected to a lower surface of the motor connecting plate; a gear rack is disposed at one side of a bottom surface of the upper shell; a torque output shaft of the second stepping motor is provided with a gear; the gear is meshed with the gear rack; the photoelectric switch is disposed at an outer end of the linear slide rail; a signal output end of the photoelectric switch is connected to a signal input end of the upper controller; and an input end of control signals of the second stepping motor is connected to the output end of control signals of the upper controller.

5. A polarizing device for a polarizing microscope, the device comprising:
    a base plate on which the polarizing microscope is fixed;
    a base support;
    a lower polarizing assembly; and
    an upper polarizing assembly;
wherein:
    the base support is vertically disposed at one side of the base plate;
    the lower polarizing assembly is disposed at a lower-middle part of the base support;
    the upper polarizing assembly is disposed at an upper part of the base support; and
    the lower polarizing assembly comprises a lower shell, a lower polarizer, and a lower drive system; a first end of the lower shell is disposed in the base support, and a second end of the lower shell is provided with a third light hole; the lower polarizer is mounted in the third light hole via a second wheel of lower polarizer; the lower drive system is disposed in the first end of the lower shell, and is connected to the second wheel; and the lower shell is provided with a lower cover board.

6. The polarizing device of claim 5, wherein the lower drive system comprises a third stepping motor, a lower controller, and a lower transmission wheel; the lower controller is mounted on an upper surface of the lower shell via a fixing sleeve; the third stepping motor is mounted on a lower surface of the lower shell; a rotary shaft of the lower transmission wheel is connected to a torque output shaft of the third stepping motor and the lower controller; a rotary wheel of the lower transmission wheel is connected to the second wheel via a third synchronous belt; and an output end of control signals of the lower controller is connected to an input end of control signals of the third stepping motor.

7. A method for using a polarizing device for a polarizing microscope, the device comprising a base plate on which the polarizing microscope is fixed, a base support, a lower polarizing assembly, and an upper polarizing assembly; wherein the base support is vertically disposed at one side of the base plate; the lower polarizing assembly is disposed at a lower-middle part of the base support; the upper polarizing assembly is disposed at an upper part of the base support;

the method comprising:
1) mounting and fixing the polarizing microscope on the base plate via a fixing screw; placing a second end of the lower polarizing assembly at a polarization starter of the polarizing microscope; inserting a second end of the upper polarizing assembly to an analyzer socket of the polarizing microscope;
2) controlling rotations of a first stepping motor and a third stepping motor using an upper controller and a lower controller; adjusting angles between an upper polarizer and a lower polarizer to allow polarizing directions of the upper polarizer and the lower polarizer to be mutually perpendicular;
3) when conducing a microscopic examination of orthogonal polarized lights, controlling the upper polarizer and the lower polarizer to rotate towards same direction and at same angular velocity using the upper controller and the lower controller; and
4) when conducting a microscopic examination of single polarized light, controlling the upper polarizer to rotate using the upper controller to allow polarizing directions of the upper polarizer and the lower polarizer to be parallel, or controlling a second stepping motor using the upper controller and moving the upper polarizer out of a light path of the polarizing microscope, and placing a dimmer in the light path of the polarizing microscope.

\* \* \* \* \*